(12) United States Patent
Faust

(10) Patent No.: US 7,517,295 B2
(45) Date of Patent: Apr. 14, 2009

(54) CONICAL DISK PAIR FOR A BELT-DRIVEN CONICAL-PULLEY TRANSMISSION

(75) Inventor: Hartmut Faust, Bühl (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 295 days.

(21) Appl. No.: 11/639,406

(22) Filed: Dec. 13, 2006

(65) Prior Publication Data

US 2007/0161442 A1 Jul. 12, 2007

Related U.S. Application Data

(60) Provisional application No. 60/750,258, filed on Dec. 14, 2005.

(51) Int. Cl.
*F16H 55/56* (2006.01)
*F16H 61/00* (2006.01)
*F16H 63/00* (2006.01)

(52) U.S. Cl. ............................. 474/18; 474/12; 474/28

(58) Field of Classification Search .................... 474/12, 474/18, 28, 44, 45, 69, 70; F16H 55/56, F16H 61/00, 63/00
See application file for complete search history.

(56) References Cited

U.S. PATENT DOCUMENTS

| | | | |
|---|---|---|---|
| 5,924,944 A * | 7/1999 | Hashimoto | 474/18 |
| 6,190,274 B1 * | 2/2001 | Walter | 474/28 |
| 6,234,925 B1 * | 5/2001 | Walter | 474/18 |
| 6,277,043 B1 * | 8/2001 | Friedmann | 474/18 |
| 6,342,024 B1 * | 1/2002 | Walter et al. | 475/210 |
| 6,669,588 B2 * | 12/2003 | Schmid | 474/18 |
| 6,997,834 B2 * | 2/2006 | Vorndran et al. | 474/28 |
| 7,048,657 B2 * | 5/2006 | Faust et al. | 474/18 |
| 7,264,564 B2 * | 9/2007 | Walter | 474/28 |
| 2003/0013566 A1 * | 1/2003 | Vorndran et al. | 474/18 |
| 2004/0259671 A1 * | 12/2004 | Gieles | 474/37 |
| 2005/0181899 A1 * | 8/2005 | Plath et al. | 474/18 |
| 2005/0209031 A1 * | 9/2005 | Walter et al. | 474/18 |
| 2005/0233844 A1 * | 10/2005 | Kuroda | 474/28 |
| 2006/0009321 A1 * | 1/2006 | Carlson et al. | 474/18 |
| 2007/0249440 A1 * | 10/2007 | Nozawa et al. | 474/28 |

* cited by examiner

*Primary Examiner*—Robert A Siconolfi
*Assistant Examiner*—Robert T Reese
(74) *Attorney, Agent, or Firm*—Alfred J. Mangels

(57) ABSTRACT

A conical disk pair for a belt-driven conical-pulley transmission includes a fixed disk, and a movable disk that is axially movable and rotationally fixed to an input shaft. A torque sensor is associated with the movable disk on a side opposite from the axially fixed disk and includes a sensing piston having axially-directed arms that are circumferentially spaced on a side of the sensing piston that faces away from the movable disk. The arms have outer axially—extending teeth that mesh with inner axial teeth of an input wheel. An inner support ring contacts the arms on an inner side radially opposite the outer teeth of the arms and forces the outer teeth of the arms into meshing engagement with circumferentially-positioned axial teeth of the input wheel.

7 Claims, 3 Drawing Sheets

CONICAL DISK PAIR FOR A BELT-DRIVEN CONICAL-PULLEY TRANSMISSION

BACKGROUND OF THE INVENTION

1. Field of the Invention

The present invention relates to a conical disk pair for a belt-driven conical-pulley transmission.

2. Description of the Related Art

Belt-driven conical-pulley transmissions such as are employed in motor vehicles, for example, generally contain two pairs of conical disks that are encircled by an endless torque-transmitting means, for example a special chain. By changing the spacing between the conical disks of each conical disk pair in opposite directions, the transmission ratio of the transmission can be varied continuously.

Advantageously, one conical disk pair, preferably the one on the power input side, includes an integrated torque sensor with which the torque acting from a drive engine is detected, and a pressure between the conical disks of the corresponding disk pair is changed in accordance with the torque. For a compact type of construction of the torque sensor it is advantageous if the torque sensor is situated directly in the structural space between a support ring wall that supports the movable disk of the conical disk pair and is rigidly connected to the shaft of the conical disk pair, and the movable disk. To make that possible, a sensing piston associated with the torque sensor has axial arms that extend through the support ring wall, and outwardly of the support ring wall are in toothed engagement with, for example, an input wheel driven by a drive engine.

Because of the toothed engagement, through which the full power or the full torque of the drive engine is transferred, heavy mechanical demands are placed on the arms of the sensing piston constructed with the toothing, which must be manufactured precisely from high-quality material and can lead to problems with regard to long-term durability when operated for long periods.

An object of the invention is to solve the above problems, i.e., to provide a possible design of the conical disk pair in such away that the arms of the sensing piston can be manufactured inexpensively while still having a long service life.

SUMMARY OF THE INVENTION

In accordance with one aspect of the invention, a conical disk pair for a belt-driven conical-pulley transmission includes an input shaft that is rigidly connected to a fixed disk. A movable disk is carried on the shaft so that it is axially movable and rotationally fixed. A torque sensing unit is provided that is rigidly connected to a sensing piston that surrounds the shaft and that is axially movable and rotatable relative to the shaft. Shaped surfaces of the torque-sensing unit are designed in such a way that when there is a change in the effective torque acting between the sensing piston and the movable disk, the axial position of the sensing piston changes by the rolling along the shaped surfaces of rolling elements that are positioned between the shaped surfaces. The sensing piston has axially directed arms spaced at a distance from each other in the circumferential direction on its side facing away from the movable disk, which arms are provided with axial teeth that mesh with axial circumferential teeth of an input wheel which is mounted on the shaft so that it is rotatable and is axially essentially immovable and is rotatably-drivable. A support ring is in contact with the arms on the side radially opposite the axial teeth of the arms and serves to force the axial teeth of the arms to mesh with the circumferential teeth of the input wheel.

The support ring provided in accordance with the invention enables radial forces that act on the arms to be supported directly. Forces acting in the circumferential direction are also absorbed by the support ring.

The circumferentially-positioned teeth of the axial projection of the sensing piston can be formed on the radial outer side of the latter, for example, if the input wheel is designed with internal teeth.

The support ring is advantageously in contact with the free end regions of the arms.

It is also advantageous for the transmission of force if the support ring does not axially overlap the toothed regions of the arms.

It is especially advantageous to attach the support ring to the arms by means of a snap connection.

For reliability of assembly, the support ring is preferably symmetrical with respect to 180° of rotation around an axis that contains a diameter of the support ring.

It is also advantageous for assembly if the support ring is designed with a pre- centering step on its faces, which can be slid onto the free ends of the arms of the sensing piston with free play.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
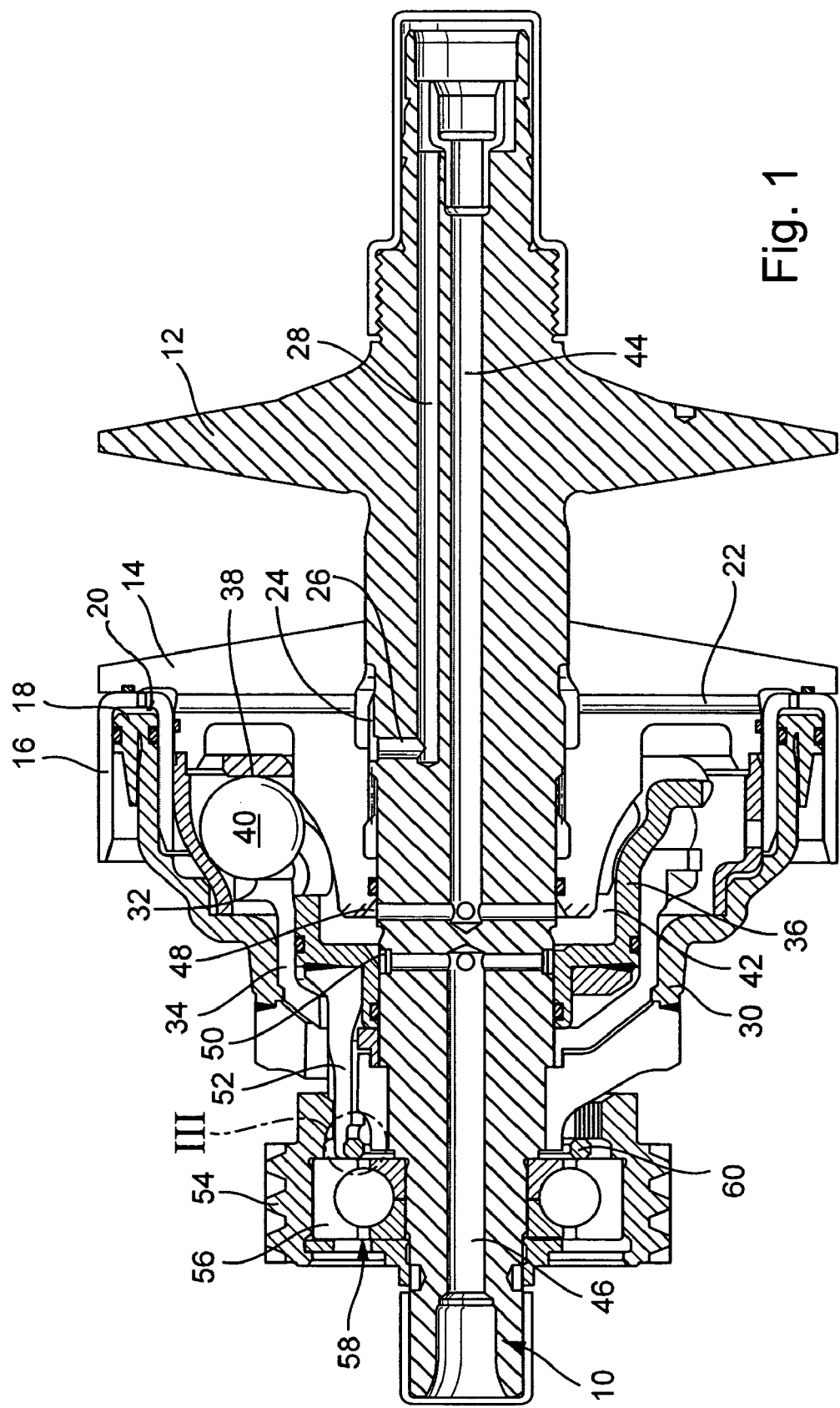
FIG. 1 is a longitudinal cross-sectional view through a conical disk pair and including a torque sensor.

In accordance with FIG. 1, a pair of conical disks of a belt-driven conical-disk transmission include an input shaft 10 that is made integral with a fixed disk 12. A movable disk 14 is axially movably but non-rotatably connected to the shaft 10. An endless torque transmitting means (not shown) runs between the conical surfaces of disks 12 and 14 and the conical surfaces of another pair of conical disks (not shown).

On the back side of movable disk 14 in its radially outer region, a cylindrical ring 16 with two walls at a radial distance from each other is rigidly attached, within which a piston 18 operates. As shown in FIG. 1, a first pressure chamber 20 is formed on the right side of piston 18, which chamber can be subjected to hydraulic pressure through radial bores 22 in movable disk 14, an annular chamber 24 between movable disk 14 and shaft 10, and a radial bore 26 and an axial bore 28 in shaft 10. The hydraulic pressure is changeable to adjust the transmission ratio.

Piston 18, which is completely annular, is rigidly connected to a support ring wall 30 that is completely cup-shaped and is rigidly connected to shaft 10. On the inside of the support ring wall 30, an annular component 34 having shaped surfaces 32 is rigidly attached.

Also; positioned inside the support ring wall 30 is a sensing piston 36, which is completely annular and is sealed against the circumferential surface of shaft 10 and an inner circumferential surface of annular component 34. Sensing piston 36 is formed with a projection directed toward movable disk 14, on the back of which disk shaped surfaces 38 are formed which are opposite to the shaped surfaces 32. Between shaped surfaces 32 and 38 are rolling bodies, in the illustrated example balls 40.

Between sensing piston 36 and movable disk 14 a second pressure chamber 42 is formed, which can be subjected to hydraulic pressure through a supply conduit 44 leading through the shaft, the hydraulic fluid being removable through a drain conduit 46 that is also formed in shaft 10.

The effective cross section of the supply opening 48 that leads into the second pressure chamber 42 is determined by the axial position of movable disk 14. The free cross section of the drain opening 50 leading out of the second pressure chamber 42 is determined by the position of the sensing piston 36. The sensing piston 36 projects through gaps in the support ring wall 30 with axial arms 52 that are preferably at equal intervals in the circumferential direction. The radial outer surfaces of the arms 52 are provided with axially and radially directed teeth, which mesh with inner teeth of an input wheel 54, which is supported and is axially essentially immovable on an outer bearing shell 56 of a bearing which is designated in its entirety as 58.

The construction and the function of the conical disk pair described so far are known and will therefore be explained only briefly.

Figure 2:
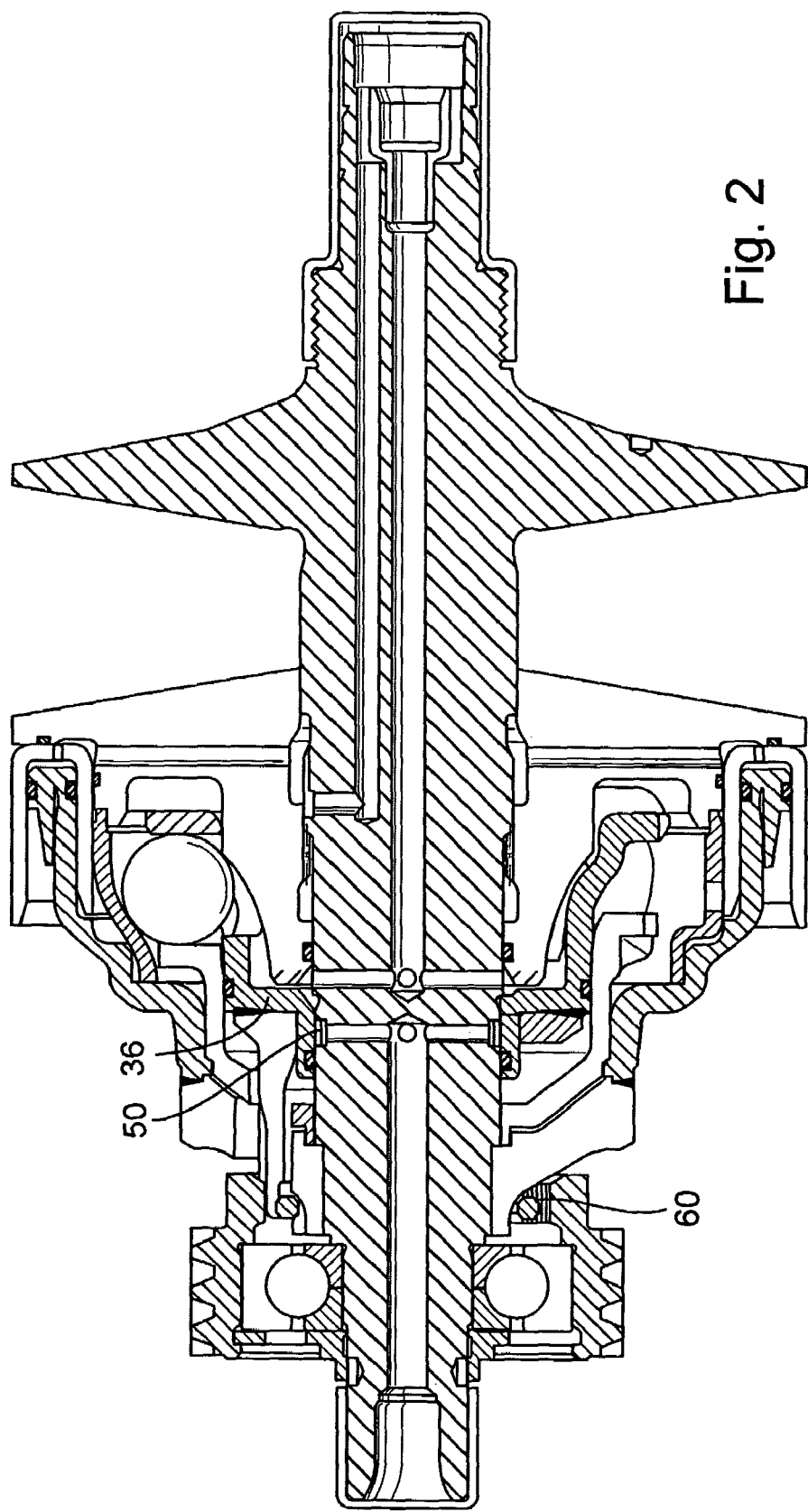
FIG. 2 is a view similar to FIG. 1 with a sensing piston of the torque sensor shown shifted axially from the position shown in FIG. 1.

When there is a torque from the rotationally drivable input wheel 54 acting on sensing piston 36, that torque is transmitted via the shaped surfaces 38, the balls 40, and the shaped surfaces 32 to the support ring wall 30 and thus to the shaft 10. The shaped surfaces are designed so that sensing piston 36 moves to the right in accordance with FIG. 1 as the torque increases, so that the drain opening 50, which is not completely covered by the sensing piston in the basic or starting position of the conical disk pair depicted in FIG. 1, is increasingly closed. FIG. 2 shows the arrangement of FIG. 1 with very high torque, at which the sensing piston is shifted as far as possible to the right and completely covers the drain opening 50. As the effective size of the drain opening 50 becomes smaller, the pressure in pressure chamber 40 increases, so that a pressure that depends upon the input torque acts on movable disk 14.

Referring again to FIG. 1, in accordance with the invention, a support ring 60 is provided to support the free ends of the arms 52, which support ring is in contact with the radially inner sides of the end regions of the arms 52 and forces them outward, so that the outer teeth of the arms 52 are forced into secure meshing engagement with the inner teeth of the input wheel 54.

The arms 52 are advantageously formed on a ring component that is welded to the sensing piston, as shown, from which they project axially. The welding of the arms or of the ring component, in that way relieves bending forces acting directly on the arms in a circumferential direction.

Figure 3:
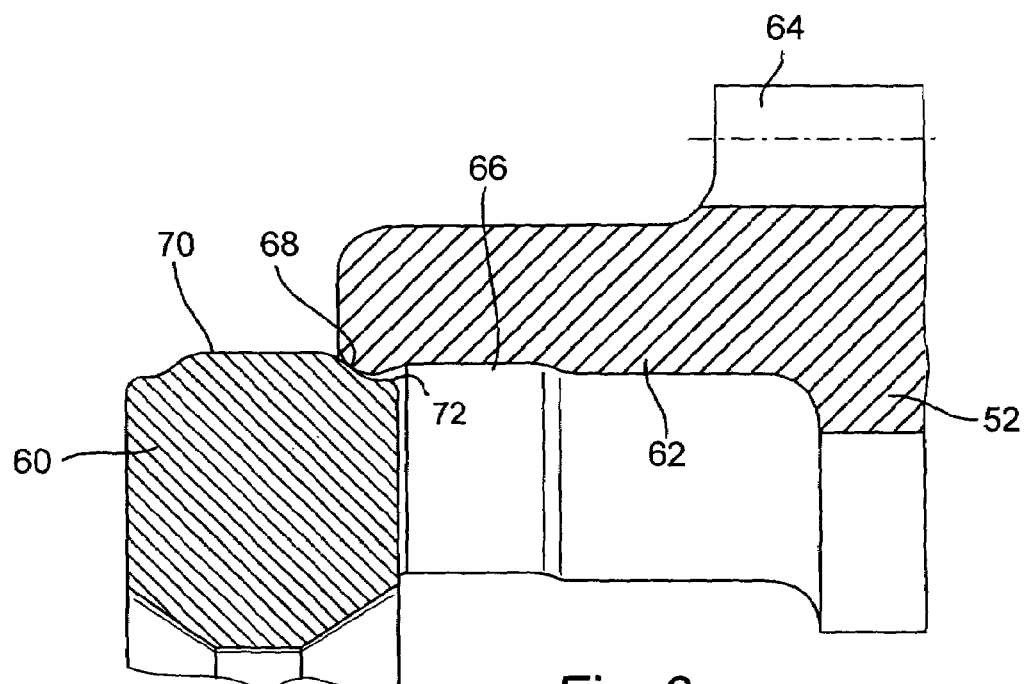
FIG. 3 is an enlarged, fragmentary cross-sectional view of a support ring at the beginning of being slid on sensing piston arms.
Figure 4:
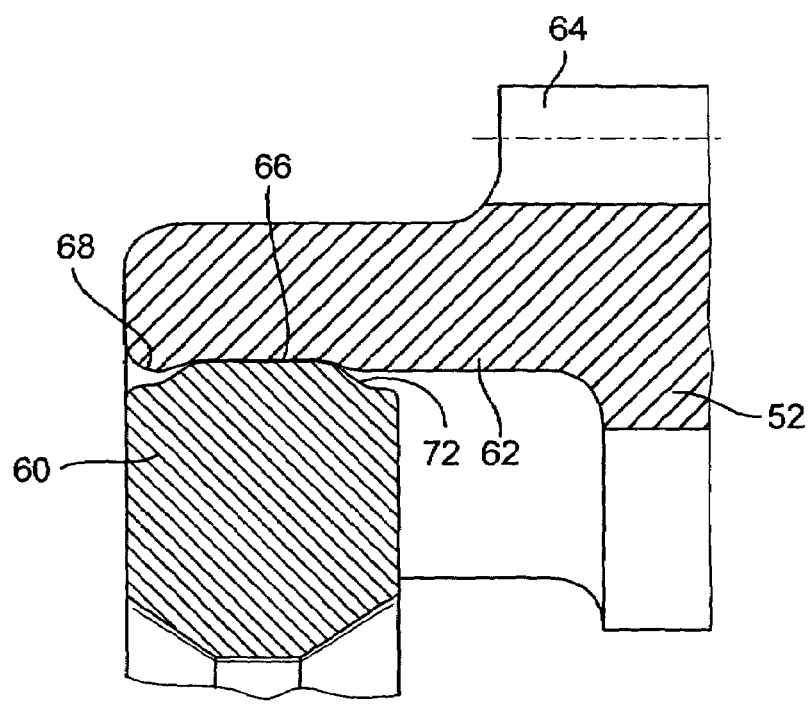
FIG. 4 is a view similar to FIG. 3 after the support ring is slid on the arms.

FIGS. 3 and 4 are enlarged sections of the circled area in FIG. 1, showing support ring 60 and the free end regions 62 of the arms 52, where only one arm of the advantageously at least three arms is shown.

In FIGS. 3 and 4 an outer tooth 64 of the arm 52 is visible, which meshes with the (unlabeled) inner teeth of input wheel 54. As can be seen from the structural arrangement shown in FIGS. 1 and 2, the external teeth 64 of arms 52 can shift relative to the internal teeth of input wheel 54, so that the axial movability of sensing piston 36 is ensured.

In accordance with FIG. 3, the inner surface of end region 62 of each finger 52 includes an annular recess 66, which terminates at the end face of arm 52 in an inward lip 68. Support ring 60 has a radially outwardly-extending outer surface 70, which is formed to correspond with recess 66 but is oversized and transitions to a pilot-type centering step 72 in order to enter into the end face of the support ring.

The cross section of support ring 60 is advantageously formed so that when it is diametrically rotated by 180° the support ring transitions, i.e., it can be inserted into the circumferentially-spaced arms 52 from both sides. The diameter of pilot-type centering step 72 of support ring 60 is slightly smaller, for example by about 0.05 mm, than the smallest diameter of inward lip 68, so that support ring 60 centers itself when slid onto the end faces of arms 52. When support ring 60 is pushed further into arms 52 their end regions 62 are expanded until support ring 60 is inserted into recess 66 and the end regions 62 spring back, so that inward lip 68 engages behind the outer surfaces 70 of support ring 60 and snap in. The oversizing of the largest diameter of outer surface 70 of support ring 60 compared to the largest inside diameter of recess 66 is of the order of magnitude of 0.15 mm, for example.

As can be seen, when inserted into the arms 52 the support ring 60 is preferably located axially somewhat outward of the outer teeth 64, in which region the arms 52 are formed radially with somewhat greater thickness than in their end regions 62.

For stabilization of the arms 52, not only in the radial direction but also in the circumferential direction, the outer surface 70 and the inner surface of the recess 66 can be axially knurled.

With the support ring in accordance with the invention it is possible to push back distortions of the arms 52 in prior processing steps, so that secure engagement of the teeth of the arms with those of the input wheel is ensured.

In the toothing of the arms a close tolerance can be maintained relative to the later joining surface with the support ring (recess 66). Independent of distortions of the arms that appear subsequently, the toothed arms are pressed into their correct position by the installed support ring.

In the described example the support ring does not require any additional space because it is located inside the thinned end regions of the arms, within an annulus that is formed between the bearing 58, the arms 52, and a seal carrier.

The attachment of the support ring through the described snap connection has the advantage over mechanically rigid connections, such as welding, that no welding or soldering is possible between the support ring and the arms on the almost finished disk pair, and because of forced movements between the support ring and the arms extraordinarily high forces occur in the case of a positive connection.

The snap connection can be designed in an unlimited variety of ways. For example, a narrow snap lug can be formed on the support ring, whereby a radial support to the left and right of the lug is provided. Alternatively, a wide snap lug can be formed on the support ring, with the radial support occurring directly on the lug, as shown in FIGS. 3 and 4, and the snap engagement occurs on both sides of the lug.

To avoid the formation of burrs, all edges are advantageously rounded off.

When installing the support ring, it is advantageous to monitor a force-distance curve when inserting the ring into the arms, so that an acceptable snap connection is ensured.

To optimize the snap geometry, it can be advantageous to vary the symmetrical design of the support ring, in which installation is possible from both sides.

The arms, which are rigidly connected to the sensing piston, are advantageously case-hardened or carbonitrided. The support ring is advantageously made of steel, a tempering steel, for example ETG100 with Rm≈1000 MPa without additional heat treatment, case-hardening steel, hardened or carbonitrided.

It is advantageous to install the support ring when measuring the soft processed part with the toothed arms.

It is also advantageous to install the support ring during the heat treatment process to reduce distortion.

In the described exemplary embodiment the arms 52 are outwardly toothed, so that support ring 60 is situated within the arms. Alternatively, the arms can be inwardly toothed and interact with outer teeth on the input wheel. The support ring is then positioned radially outside of the arms, and forces them inward into meshing engagement with the input wheel.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A pair of conical disks for a belt-driven conical-pulley transmission, which pair of conical disks includes:
    an input shaft which is rigidly connected to a fixed disk,
    a movable disk which is carried on the input shaft so that it is axially movable and rotationally fixed relative to the shaft,
    a torque sensing device with an outer shaped surface that is rigidly connected to the shaft and an inner shaped surface that is rigidly connected to a sensing piston that encircles the shaft and is axially movable and rotatable relative to the shaft, wherein the shaped surfaces are formed so that when there is a change in effective torque acting between the sensing piston and the movable disk the axial position of the sensing piston changes by the rolling of rolling elements on the shaped surfaces,
    wherein the sensing piston includes axially directed arms circumferentially spaced from each other on a side of the sensing piston facing away from the movable disk,
    wherein the arms include axially-extending teeth that mesh with axially-extending teeth of an input wheel rotatably mounted on the shaft and axially fixed, and
    a support ring in contact with the arms on a surface radially opposite the axial teeth of the arms, wherein the supporting ring urges the teeth of the arms to mesh with the teeth of the input wheel.

2. A conical disk pair in accordance with claim 1, wherein the teeth of the arms of the sensing piston are formed on a radially outer side of the arms.

3. A conical disk pair in accordance with claim 1, wherein the support ring is in contact with free end regions of the arms.

4. A conical disk pair in accordance with claim 1, wherein the support ring is axially spaced from the teeth of the arms.

5. A conical disk pair in accordance with claim 1, wherein the support ring is attached to the arms by a snap connection.

6. A conical disk pair in accordance with claim 1, wherein the support ring is symmetrical in reference to a rotation by 180° around an axis containing a diameter of the support ring.

7. A conical disk pair in accordance with claim 1, wherein the support ring includes a pilot centering step on end faces, wherein a centering step is slidable into free ends of the arms of the sensing piston with free play.

* * * * *